United States Patent [19]

Heggie

[11] Patent Number: 4,887,827
[45] Date of Patent: Dec. 19, 1989

[54] BICYCLE SAFETY TURNING DEVICE

[76] Inventor: Jack E. Heggie, 3241 E. 28th St., Tucson, Ariz. 85713

[21] Appl. No.: 238,190

[22] Filed: Aug. 30, 1988

[51] Int. Cl.$^4$ .............................................. B62K 5/04
[52] U.S. Cl. .................................... 280/272; 280/271; 403/375; 403/385
[58] Field of Search ................ 280/271, 272; 403/375, 403/384, 385, 179, 344, 404

[56] References Cited

U.S. PATENT DOCUMENTS

| | | |
|---|---|---|
| 576,566 | 2/1897 | Foehl . |
| 642,269 | 1/1900 | Smith . |
| 691,597 | 7/1902 | Christiansen . |
| 1,230,801 | 6/1917 | Schriver . |
| 4,006,915 | 2/1977 | Parker . |
| 4,029,329 | 6/1977 | Chambers ............................ 280/272 |

FOREIGN PATENT DOCUMENTS 16945 of 1900 United Kingdom ................ 280/272

*Primary Examiner*—Charles A. Marmor
*Assistant Examiner*—Donn McGiehan
*Attorney, Agent, or Firm*—J. Michael McClanahan

[57] ABSTRACT

A bicycle safety turning device for installation upon a bicycle frame lower cross bar adapted to be engaged by the bicycle front wheel fork shoulder to limit the front fork from turning so far to the left or right as to be at a right angle to the forward movement of the bicycle and cause the bicycle to jackknife while riding. More specifically, the bicycle safety turning device consists of a pair of clamp members adapted to surround the bicycle frame lower cross bar, capped with clamp plates, and a pair of bolts bringing the two clamp plates and clamp members together, the bolts also holding a striker plate against which the front fork shoulder comes in contact after the front fork has turned through an arc of 35 to 45 degrees as desired. Encountering the striker plate, the fork is prevented from further turning. The clamp members are secured against the bicycle frame lower cross bar by a frictional fit, and in addition, by a plurality of ram darts, the point of which is forced into the cross bar by tightening the bolts residing upon the clamp plates which bring the clamp members together. Alternate embodiments provide a striker bar adapted to prevent turning of differently constructed bicycle front wheel forks and modifications for mounting the invention on the fork shaft bearing tube with a striker plate dropping down to be engaged by the front wheel fork shoulder.

14 Claims, 1 Drawing Sheet

BICYCLE SAFETY TURNING DEVICE

BACKGROUND OF THE INVENTION

1. FIELD OF THE INVENTION

The field of the invention is devices which prevent a bicycle from jackknifing by restricting the turning of the front wheel fork in order that the front wheel will never be permitted to be at right angles to the direction of travel of the bicycle.

2. DESCRIPTION OF THE RELATED ART

As every person who has ridden a bicycle no doubt knows, if the front wheel strikes an obstruction as the bicycle progresses forward, there is a tendency for the wheel to veer to the left or to the right. If unchecked, either by the bicycle rider firmly holding the handle bars or some other restraining device, the bicycle wheel will turn left or right until it has reached a position at right angles to the direction of travel. At that point, the front wheel now acts as a brake, not being able to roll over the obstruction and the bicycle stops forward travel completely and flips over the point of the wheel engaging the obstruction and throws the rider over the handle bars, the bicycle following.

The front wheel fork of a bicycle bows frontwards to make steering easier. This front bow is called a "negative caster". However, one result of this negative caster is that when the front wheel of the bicycle strikes an obstruction in the roadway, the tendency is to cause the bicycle wheel to turn either to the left or to the right and continue turning unless interrupted as above described.

This problem is not a recent problem and over the years there has been a number of devices constructed and patented which tend to present solutions to the problem above discussed, however, all devices known to the Inventor are rather complicated devices or provide a constant restraint upon the directional turning of the front wheel such as to interfere with the normal operator directed steering.

For example, Schriver in U.S. Pat. No. 1,230,801, and Parker in U.S. Pat. No. 4,006,915, disclose devices which attach springs to the front wheel fork prongs to place a constant restraint upon the turning of the fork in either direction. Each spring attaches to each prong with the springs converging to join to the bicycle frame lower cross bar. In an alternate embodiment, the two springs formerly attached to the front fork prongs are attached to the handle bars on either side of the front wheel fork shaft or post.

Christiansen in U.S. Pat. No. 691,597, discloses a device wherein a portion of the front wheel fork shaft above the fork bearing tube is made in the shape of a tear (in cross-sectional view) with spring loaded lever arms engaging opposite sides of the tear such that when the front fork turns, one lever arm is cammed out, the lever arm thus putting more pressure to return the fork to a position of least amount exerted pressure, i.e., return the fork to a forward direction.

Foehl, in U.S. Pat. No. 576,566, attaches a semicircular rod at its open points to opposite prongs in the front wheel fork and then permits the semicircular rod to slide through an eyelet mounted to the bicycle frame lower cross bar. At the center part of the semicircular curved rod is formed a notch and a spring loaded dog attached to the eyelet engages that notch such that to turn the bicycle front wheel fork left or right, the operator must overcome the spring loaded dog engaging the notch in the semicircular rod.

A rather interesting device for keeping the front wheel fork aligned straight ahead even when hitting obstructions is shown in the patent to Smith, U.S. Pat. No. 642,296. Smith corrects the problem of the negative caster by placing the front wheel fork turning axis ahead of the rotational point of the front wheel. This is accomplished by holding the steering wheel fork post at the end of a rotating bar, the rotating bar having its point of rotation along the previously mentioned axis which is ahead of the front wheel pivot point. Smith's device suffers from complexity and a great cost to manufacture and raises questions about whether the resultant strength of the bicycle frame after the improvement is added has been compromised.

While all the above devices do tend to restrict the turning of the bicycle steering wheel fork yet they are rather complex and expensive devices to construct and do impede steering of the bicycle during normal usage.

Accordingly, it would be useful to have a device adapted to interrupt the front wheel fork from turning to the point to where the bicycle is caused to jackknife but does not interfere with steering of the bicycle during normal riding. In addition, it would be useful if such a device may be easily installed and easily removed from the bicycle.

SUMMARY OF THE INVENTION

This invention relates to a easily installed, easily removed bicycle safety turning device which prevents the front bicycle wheel from being turned sideways when it hits an obstruction so far as to be at right angles to the direction of travel of the bicycle and thus cause the bicycle to jackknife and throw the rider over the handle bars.

In the preferred embodiment, means are provided to limit or inhibit the continued rotation of the bicycle front wheel beyond a certain point by placing a stop to the rotation of the front wheel fork. This stop consists of a striker plate operably mounted to the bicycle frame lower cross bar such that the striker plate is encountered or struck by the front wheel fork shoulder or crown after the front fork has turned through a selected angle of 35 to 45 degrees from the straight-ahead direction of travel. The means by which the striker plate is held to the bicycle frame lower cross bar is accomplished by means of a pair of clamp members, each clamp member covering one-half of the cross bar and then brought together to compress the cross bar between them. A pair of elongated bolts are used to bring the clamp members together against the cross bar with the elongated bolts also holding the striker plate in place proximate the bicycle front wheel fork shoulder or crown.

Since there is the possibility that the striker plate may be struck by the bicycle front wheel fork crown a number of times, especially by children playing with the device, or it may be struck rather hard when the bicycle front wheel has been turned aside by hitting an obstruction, means are additionally provided with the clamp members to assure that the clamp members do not rotate on the bicycle frame lower cross bar, even though the clamp members are frictionally held to the cross bar. Such means consist of a plurality of ram darts which are forced into the lower cross bar when the pair of clamp members are brought together in a holding configuration on the lower cross bar. The heads of the pair of bolts which bring the two clamp members together directly force the ram darts into the cross bar to a depth of 1/16th. inch or so. By engaging the cross bar in a tight frictional fit by the clamp members, and with the added partial penetration of the cross bar by the ram darts, assurance that the clamp members will not rotate and will hold the striker plate securely against repeated strikes is given.

Alternate embodiments provide different structures for the striker plate for those bicycles whose front wheel fork do not provide a well defined shoulder or crown, but whose fork rather appear mostly to smoothly divide into two prongs from the front wheel fork post.

Further, another embodiment utilizes the underlying invention to secure about the front wheel fork shaft bearing tube or torque tube a striker bar reaching down to be engaged by the front wheel fork shoulder.

It is an object of the subject invention to provide a bicycle safety turning device which prevents the bicycle front wheel from turning so far as to permit the bicycle to jackknife.

It is another object of the subject invention to provide a bicycle safety turning device which does not interfere with the steering of the front wheel until the front wheel fork has turned an amount where complete turning to 90 degrees is imminent.

It is another object of the subject invention to provide a bicycle safety turning device which is secured to the bicycle frame such as to resist becoming unsecured.

It is another object of the subject invention to provide a bicycle safety turning device which handles multiple types of bicycle front wheel fork constructions.

Other objects of the invention will in part be obvious and will in part appear hereinafter. The invention accordingly comprises the apparatus comprising the construction, combination of elements, and arrangement of parts which are exemplified in the following detailed disclosure and the scope of the invention which will be indicated in the Claims.

BRIEF DESCRIPTION OF THE DRAWINGS

For further understanding of the nature and objects of the subject invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
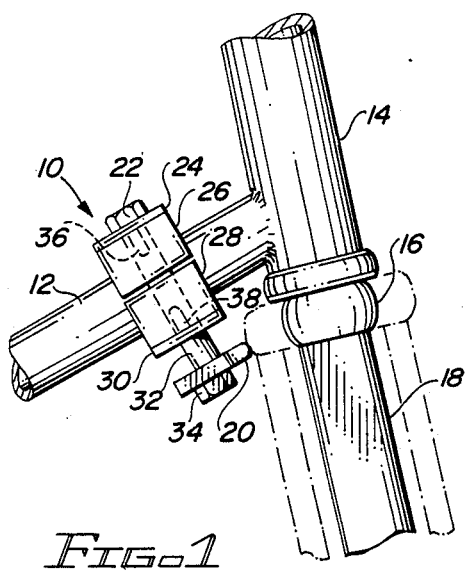
FIG. 1 is a side view of the invention attached to a bicycle frame.

Referring now to FIG. 1, a side view of the subject invention in place on the bicycle frame lower cross bar proximate the shoulder or crown of the bifurcated front wheel fork. More particularly, bicycle safety turning device 10 is clamped about the bicycle frame lower cross bar 12 which attaches between the fork bearing tube or torque tube 14 and the bicycle sprocket assembly (not shown), safety turning device 10 situated proximate the shoulder or crown 16 of the front wheel fork 18 such that as the front wheel fork is turned, when it reaches a certain point, shoulder 16 will encounter striker plate 20 of the bicycle safety turning device 10 and prevent or limit further turning of the front wheel fork 18. The safety turning device is selectively located upon the lower cross bar 12 at a position where the front wheel fork is inhibited from turning to the left or to the right more than 35 to 45 degree angle or so from the forward direction of travel. It has been determined that limiting the movement of the front wheel fork to turns less than approximately 35 to 45-degrees still allows a 26 inch wheel bicycle to be ridden in a circle as small as 9 feet in diameter.

The inventive bicycle safety turning device 10 comprises the following major components, beginning at the top as seen in FIG. 1, elongated bolt 22, which runs the full length of the invention, clamp plate 24 which resides directly under bolt 22 and juxtaposed upper clamp member 26. Directly opposite upper clamp member 26 is lower clamp member 28 which is identical to upper clamp member 26 in construction. Following lower clamp member 28 is juxtaposed the second clamp plate 30 followed by spacer nut 32, spacer nut 32 threaded upon bolt 22. Next, striker plate 20 is shown with lastly lock nut 34 threaded upon bolt 22 and holding all parts together securely encompassing the lower frame cross bar 12 in a tight frictional fit. In the invention and not seen in FIG. 1, are two bolts 22 which pass through openings formed in both clamp plates 24 and 30, through both clamp members 26 and 28, and striker plate 20. Shown in dotted form in FIG. 1 is a portion of the shank of elongated bolt 22 and two ram darts 36 and 38 which will be discussed more fully in FIG. 2. Also shown in dotted form is the position of shoulder 16 striking striker plate 20 when the front wheel fork 18 has been turned.

Figure 2:
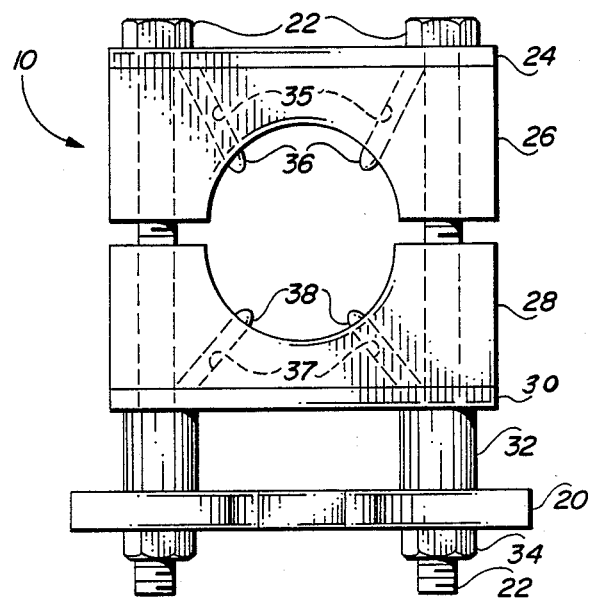
FIG. 2 is a front view of the invention.

FIG. 2 shows a front view of the subject bicycle safety turning device 10 showing more clearly the relationship of the elements comprising the device. As before, from top to bottom, the heads of elongated machine bolts 22 are shown residing upon the top surface of clamp plate 24, bolts 22 passing through openings in clamp plate 24 and into a pair of openings formed in upper clamp member 26 and into openings formed in lower clamp member 28. Also shown more clearly in FIG. 2 are the first pair of elongated ram darts 36 with their rounded or pointed noses just protruding interiorly to the semi-circle formed in upper clamp member 26. Ram darts 36 slide in passageways 35 formed in upper clamp member 26, the passageways is immediately adjacent to the opening formed for the shank of bolt 22 in upper clamp member 26. The intent here is that the head of bolt 22 will be directly above the top of ram dart 36 so that there is a direct in-line connection through clamp plate 24.

In the preferred embodiment, bolts 22 are constructed of case-hardened steel as are the clamp plates 24 and 30. Upper clamp member 26 is constructed of aluminum but ram darts 36 are hardened steel. Lower clamp member 28, an exact duplicate of upper clamp member 26, also has passageways 37 slideably holding ram darts 38 in place. The location of passageways 37 in lower clamp member 28 is similarly constructed as are the passageways in upper clamp 26 so as to be in direct line with spacer nuts 32 and clamp plate 30. Immediately below lower clamp member 28 is clamp plate 30 followed with spacer nuts 32 threaded upon the shank of bolts 22. Striker plate 20 is next shown followed by lock nuts 34 and the shanks of bolts 22. The height of spacer nuts 32 is determined by what distance is required to correctly position striker plate 20 once the placement of the clamp member upon the bicycle lower frame cross bar has been accomplished.

It is intended that when the invention is installed upon the lower frame cross bar of a bicycle, the clamp members are brought compressibly against the cross bar such that ram darts 36 and 38 are forcibly indented into the cross bar a 16th. inch or so, enough so that with the frictional hold of the clamp members upon the cross bar, a very substantial resistance to rotation of the clamp members on the cross bars is presented. Inasmuch as kids like to play with bicycles, it is envisioned that substantial hammering of striker plate 20 by the shoulder of the front wheel fork will be done and the temptation of the clamp member to rotate is avoided. Without ram darts 36 and 38, to insure no rotation of the safety device upon the cross bar requires that the bolts 22 be tightened so tight that the upper and lower clamp members may deform the cross bar and substantially weaken it. Accordingly, it was deemed that the ram darts will accomplish the purpose of preventing rotation with minimum damage to the cross bar. This is especially so in modern bicycles which may utilize light weight metals, such as aluminum and magnesium, for the bicycle frames. After removal of the device, the remaining indentations in the cross bar are barely noticable and no paint is removed by the clamp members. To assure that minimum scarring and damage is done to the lower cross bar, a soft metal such as aluminum was utilized for the frictional fit of the clamp members in the preferred embodiment. The other members of the invention were, as mentioned above, hardened steel for strength.

Figure 3:
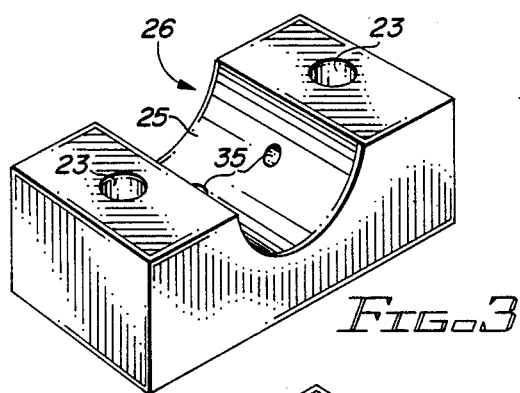
FIG. 3 is a perspective view of the upper clamp member.

The various parts of the invention are individually shown in the following FIGS. 3-7. In FIG. 3, a perspective front view of upper clamp member 26 is shown detailing the semi-circular gripping surface 25 which is adapted to surround the lower cross bar 12, and openings to the passageways 35 in the semi-circular gripping surface which receives the ram darts (not shown). Also shown are the two openings 23 which receive the shank of bolt 22. As discussed in combination with FIG. 2, semi-circular gripping surface 25 is preferably the same or nearly the same diameter as the lower cross bar 12. In experimentation, it has been found that a large majority of the lower cross bars have a diameter of 1 inch and accordingly the semi-circular gripping surface 25 has a radius of ½ inch. As earlier mentioned, upper clamp member 26 and lower clamp member 28 are identical in construction and may be interchanged. As noted in the discussion in connection with FIG. 3, passageways 35 have one opening not directly in line between openings 23, but slightly off set on both sides of a line connecting the centers of openings 23. However, the other opening of passageway emerges on the opposite side of upper clamp member 26 next to opening 23 such that at the point of exit from upper clamp member 26, passageway 35 openings are in line with openings 23. Thus, passageways 35 are angled.

Figure 4:
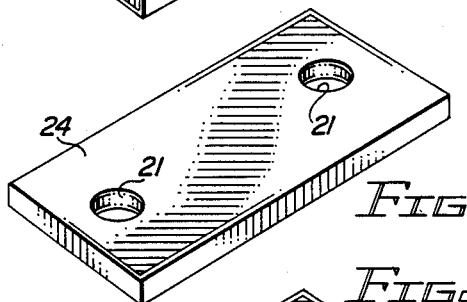
FIG. 4 is a perspective view of the steel plate which overlies the clamp member.

Referring now to FIG. 4, a perspective view of clamp plate 24 is shown detailing its construction having a thickness of about ⅛th. inch in the preferred embodiment and a width and length the same as the width and length of upper clamp member 26 top surface. Openings 21 in clamp plate 24 receive the shank of bolt 22 and are in line with the openings 23 in the upper and lower clamp members 26 and 28. Like upper and lower clamp members 26 and 28, clamp plate 24 is identical to clamp plate 30 and may be interchanged.

Figure 5:
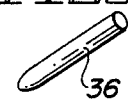
FIG. 5 is a perspective view of the ram dart which operates in the upper clamp member.

FIG. 5 is a perspective view of ram dart 36 showing it to be an elongated pin with one flat end and a rounded opposite end. The end, of course, may also be pointed. In the preferred embodiment, ram dart 36 was constructed of hardened steel and was 5/32 inch in diameter.

Figure 6:
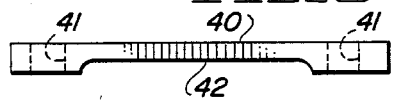
FIG. 6 is an alternate embodiment of the steel plate of FIG. 4.

Referring now to FIG. 6, an end view of alternate embodiment of clamp plate 24 is shown wherein modification has been made to accomodate use of the invention upon bicycles whose frame lower cross bar 12 is of a diameter slightly larger than 1 inch, but where the semi-circular gripping surface 25 of the upper and lower clamp members have a radius of ½ inch. Here, a cavity 42 has been formed on the underside of the alternate clamp plate 40 in order that the ram darts would not be indented so far into the lower frame cross bar as they would otherwise. The assumption here is that the clamp members would still be brought substantially together compressing the cross bar within the semi-circular gripping surface. The cavity portion 42 of clamp plate 40 allows the end of ram darts to come up into the cavity portion a slight amount, and thus not protrude as deeply into the oversized lower cross bar as they would for ram darts normally used with the usual upper and lower clamps for a 1 inch frame cross bar. Shown in the alternate clamp plate 40 in FIG. 6 are dotted lines for the openings 41 which receive the shank of the bolt 22.

Figure 7:
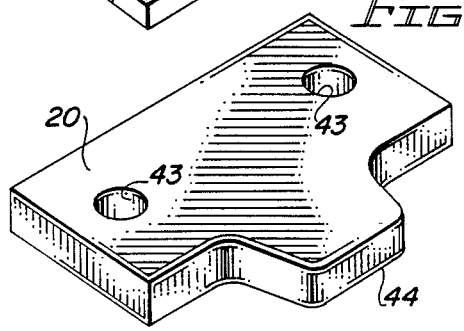
FIG. 7 is a perspective view of the striker plate which is held by the clamp member.

Referring now to FIG. 7, a perspective view of striker plate 20 is detailed showing it to have substantially the same top surface areas as the top surfaces of clamp plate 30 with the exception that striker boss 44 protrudes from one of the long sides. Striker boss 42 is adapted to be struck or encountered by shoulder 16 of the front wheel fork 18, shoulder 16 being the top portion of the fork where the two members of the fork bifurcate to encompass the front wheel. In the preferred embodiment, striker plate 20 is also of hardened steel to enable it to withstand repeated strikes by the front fork shoulder 16. Boss 44 protrudes outstandingly from the main body of striker plate 20 about ½ inch in the preferred embodiment. Further, in the preferred embodiment, striker plate 20 is nominally of ¼ inch thickness. Openings 43 to receive the shank of bolts 22 are also shown.

With the invention as shown and described in the above Figures, exact placement of the safety turning device upon the frame lower cross bar is a matter of first loosely locating the clamp members upon the cross bar and then turning the wheel from one side to the other to determine how much rotation is permitted before the shoulder strikes the striker bar. Adjustment is made by sliding the device forward or backward upon the cross bar until the correct position is indicated when the front wheel fork allows the bicycle to be turned in a 9 foot or so diameter circle. It may also be necessary to utilize various sizes of spacer nuts to assure correct and optimal positioning. For a 26 inch bicycle, this should be between 35 and 45 degrees of turning freedom from a straight ahead direction on the bicycle. Once the correct position is indicated, the nuts on the bolt 22 are tightened, firstly spacer nuts 32 to cause engagement of the lower frame cross bar 12 by the ram darts 36 and 38 and then the semi-circular gripping surface 25 of the clamp members fully engaging the lower cross bar. Lastly, nuts 34 are tightly secured to hold striker plate 20 in place. At this point in time, the invention is ready for use.

Figure 8:
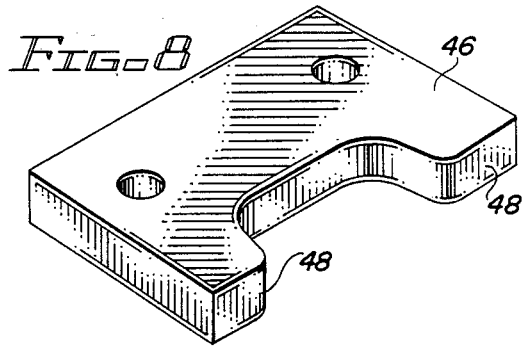
FIG. 8 is an alternate embodiment of the striker plate.

FIG. 8 shows an alternate embodiment of the invention accomodating those bicycles which do not have a well defined shoulder 16 which protrudes at right angles to the front wheel fork shank or post which resides interiorly to the fork bearing tube 14. In the bicycles for which the device has been altered as shown in FIG. 8, the bifurcated fork in the front wheel fork assembly is a smooth curved element which splits to form the bifurcated fork. In these cases, a striker plate as shown in FIG. 8 is adapted to be engaged by either side of the two members of the bifurcated fork. More specifically, in FIG. 8, alternate striker plate 46 is detailed in a perspective view where the centrally located striker boss 44 of striker plate 20 (FIG. 7) has been removed and a pair of oppositely located striker bosses 48 protruding from opposite ends of alternate striker plate 46 is shown. The striker bosses 48 are struck by one side or another of the front wheel fork bifurcated prongs at a point generally below where original striker plate 20 would be located as striker plate 46 engages the fork after the fork has been defined, but certainly above the wheel. In such case, a modification to the invention by use of longer bolts 22 spacer nuts 24 as shown in FIGS. 1–7 would be required.

Figure 9:
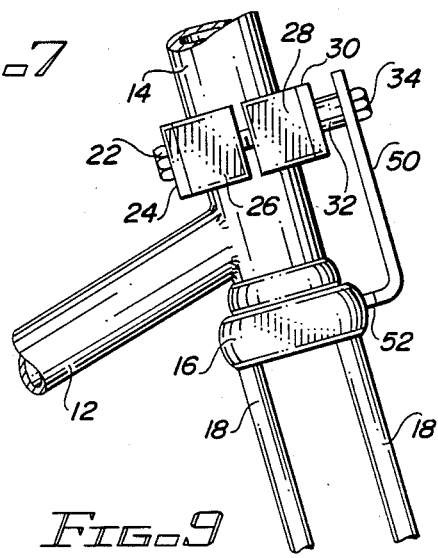
FIG. 9 is a side view of an alternate embodiment installed upon a bicycle.

FIG. 9 shows an alternate embodiment of the device where for convenience, a slight modification of the device has been made and the device located upon the fork bearing tube 14. In this case, the only difference, other than the size of the semi-circular gripping surface formed in the upper and lower clamp members is that the striker plate normally utilized has been modified to reach down to engage the shoulder 16 of front fork 18. More specifically, the device shown in FIG. 9 utilizes the same elements as before, particularly elongated bolts 22, clamp plates 24 and 30, upper and lower clamp members 26 and 28, and spacer nut 32. Following spacer nut 32 is modified striker plate 50, striker plate 50 being elongated and reaching down from the fork bearing tube 14 to the shoulder 16 of front wheel fork 18. Striker plate 50 is characterized by having its lower end bent at a right angle turned in towards shoulder 16. At the lower end of striker plate 50 is formed striker boss 52 which takes on the same construction as striker boss 44 shown in FIG. 7 (or the twin striker bosses 48 of alternate striker plate 46). Following striker plate 50, lock nut 34 holds the device together in place on the fork bearing tube 14. Like the preferred embodiment of the invention, ram darts 36 and 38 are utilized in combination with the upper and lower clamp members 26 and 28 to secure clamps about the fork bearing tube 14. In FIG. 9, front wheel fork 18 is shown in its turned position detailing the two parallel prongs 18 that define the fork to secure the front wheel (not shown) and with a wider view of shoulder 16. In FIG. 9, shoulder 16 is shown actually striking striker boss 52 of striker plate 50.

Figure 10:
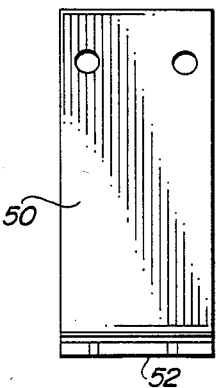
FIG. 10 is a rear view of the striker plate employed in the alternate embodiment of FIG. 9.

FIG. 10 is a front view of the alternate striker plate 50 of FIG. 9 showing at its bottom, the protruding end and striker boss 52 which engages shoulder 16.

While a preferred embodiment and alternate embodiments have been shown and described, it will be understood that there is no intent to limit the invention by such disclosure, but rather it is intended to cover all modifications and alternate constructions falling within the spirit and the scope of the invention as defined in the appended Claims.

I claim:

1. A bicycle safety turning device for installation upon a bicycle frame lower cross bar to prevent the bicycle front wheel from turning to a right angle to the direction of bicycle travel and causing the bicycle to jackknife by selectively limiting turning of the front wheel fork to the left and to the right, the bicycle safety turning device comprising:

a striker plate adapted to be encountered by the front wheel fork to limit turning of the front wheel fork; and a pair of clamp members adapted to encircle the bicycle frame lower cross bar and a pair of clamp plates juxtaposed said pair of clamp members, said clamp plates adapted to be forcibly urged against said clamp members, said pair of clamp members and said pair of clamp plates operably attached to said striker plate to selectively position said striker plate proximate the front wheel fork, said pair of clamp members comprising members of soft metal and said pair of clamp plates comprising plates made of hardened metal, said soft metal clamp members forcibly engaging the bicycle lower cross bar to frictionally secure said clamp members and thus said striker bar to the bicycle frame lower cross bar to reduce scarring and damage to the bicycle frame lower cross bar whereby the degree of turning of the front wheel fork is selectively limited.

2. The bicycle safety turning device as defined in claim 1 further includes a pair of elongated bolts and nuts operable upon said bolts, said elongated bolts engaging said pair of clamp members and said pair of clamp plates, said nuts tightened upon said bolts to forcibly clamp the bicycle frame lower cross bar between said pair of clamp members.

3. The bicycle safety turning device as defined in claim 2 wherein said striker plate is operably attached to said clamp members by said bolts and nuts whereby said striker plate is selectively positioned proximate the front wheel fork.

4. The bicycle safety turning device as defined in claim 3 wherein said clamp members include a plurality of elongated ram darts having two ends, one end of said ram darts adapted to indent into the bicycle lower frame cross bar to additionally secure said clamp members to the bicycle frame lower cross bar.

5. The bicycle safety turning device as defined in claim 4 wherein said pair of clamp members include passageways in said clamp members, said passageways slidably receiving said ram darts to permit the ram darts to be forcibly indented into the bicycle frame lower cross bar.

6. The bicycle safety turning device as defined in claim 5 wherein said passageways in said clamp members intersect said clamp plates and the bicycle frame lower cross bar whereby said clamp plates engage the other end of said ram darts to forcibly indent said ram darts into the bicycle frame lower cross bar.

7. The bicycle safety turning device as defined in claim 6 wherein said striker plate adapted to be encountered by the front wheel fork includes an outstanding boss, said boss adapted to be encountered by the front wheel fork when turned to limit further turning of the front wheel fork.

8. The bicycle safety turning device as defined in claim 6 wherein said striker plate adapted to be encountered by the front wheel fork includes a pair of oppositely situated outstanding bosses, said bosses adapted to be encountered by the front wheel fork to limit further turning of the front wheel fork.

9. The bicycle safety turning device as defined in claim 6 wherein said pair of clamp plates define a cavity portion formed in each of said clamp plates, said cavity portion engaging the other end of said ram darts to forcibly indent said ram dart into the bicycle frame lower cross bar whereby the amount of indentation of the ram darts into the bicycle frame lower cross bar may be varied.

10. A bicycle safety turning device for installation upon a bicycle frame fork bearing tube to prevent the bicycle front wheel from turning to a right angle to the direction of bicycle travel and causing the bicycle to jackknife by selectively limiting turning of the front wheel fork to the left and to the right, the bicycle safety turning device comprising:
   a striker plate adapted to be encountered by the front wheel fork to limit turning of the front wheel fork; and
   a pair of clamp members adapted to encircle the bicycle frame fork bearing tube and a pair of clamp plates juxtaposed said pair of clamp members, said pair of clamp members and said pair of clamp plates operably attached to said striker plate to selectively position said striker plate proximate the front wheel fork, said pair of clamp members comprising members of soft metal and said pair of clamp plates comprising plates made of hardened metal, said soft metal clamp members forcibly engaging the bicycle frame fork bearing tube to frictionally secure said clamp members and thus said striker bar to the bicycle frame fork bearing tube to reduce scarring and damage to the bicycle frame fork bearing tube whereby the degree of turning of the front wheel fork is selectively limited.

11. The bicycle safety turning device as defined in claim 10 further includes a pair of elongated bolts and nuts operable upon said bolts, said elongated bolts engaging said pair of clamp members and said pair of clamp plates, said nuts tightened upon said bolts to forcibly clamp the bicycle frame fork bearing tube between said pair of clamp members.

12. The bicycle safety turning device as defined in claim 11 wherein said striker plate is operably attached to said clamp members by said bolts and nuts to selectively position said striker plate proximate the front wheel fork.

13. The bicycle safety turning device as defined in claim 12 wherein said means operably attached to the clamp members includes a plurality of elongated ram darts having two ends, and said pair of clamp members include passageways in said clamp members intersecting said clamp plates and the bicycle frame fork bearing tube, said passageways slidably receiving said ram darts to permit said clamp plates to engage one end of said ram darts to forcibly indent the other end of said ram darts into the bicycle frame fork bearing tube to additionally secure said clamp members to the bicycle frame fork bearing tube.

14. The bicycle safety turning device as defined in claim 13 wherein said striker plate adapted to be encountered by the front wheel fork defines an elongated plate having two ends, one end of which is operably attached to said pair of bolts and the other end of which includes an outstanding boss, said boss adapted to be encountered by the front wheel fork when turned to limit further turning of the front wheel fork.

* * * * *